United States Patent

Premiski et al.

Patent Number: 5,456,476
Date of Patent: Oct. 10, 1995

[54] PLANET GEAR CARRIER WITH AN ANNULAR OIL SHIELD

[75] Inventors: Vladimir Premiski, Bad Muenstereifel-Willerscheidt; Wilhelm Wehren, Kerpen/Blatzheim; Mark Silk, Cologne, all of Germany

[73] Assignee: Ford Motor Company, Dearborn, Mich.

[21] Appl. No.: 181,715

[22] Filed: Jan. 18, 1994

[30] Foreign Application Priority Data

Feb. 2, 1993 [DE] Germany ............. 43 02 844.6

[51] Int. Cl.$^6$ .................. F16J 15/00; F16H 57/08
[52] U.S. Cl. .................. 277/188 R; 277/53; 277/68; 475/159
[58] Field of Search .................. 277/12, 53, 67, 277/68, 188 R, 188 A, 212 C, 214, 25, 166, 181; 475/159

[56] References Cited

U.S. PATENT DOCUMENTS

| | | | |
|---|---|---|---|
| 2,652,575 | 9/1953 | Bukelb | 277/188 R |
| 3,003,835 | 10/1961 | Schindel | 277/188 R |
| 3,178,191 | 4/1965 | Dodd et al. | 277/188 R |
| 3,477,731 | 11/1969 | Workman | 277/188 R |
| 4,540,186 | 9/1985 | Beidler | 277/188 R |

FOREIGN PATENT DOCUMENTS

| | | |
|---|---|---|
| 3305419C2 | 2/1983 | Germany . |
| 0274874B1 | 7/1988 | Germany . |

*Primary Examiner*—Daniel G. DePumpo
*Attorney, Agent, or Firm*—Donald A. Wilkinson; Roger L. May

[57] ABSTRACT

A planet gear carrier with an annular oil shield that is secured in a region outside the planet wheel spindle to a side wall of the planet wheel carrier formed as a drum member of an adjacent clutch and extends so far radially inward that its inner edge inwardly overlaps the axial lubricating bores in the planet wheel spindles. The oil shield comprises a self-locking cone ring spreadably braced against the inner circumference of the drum member, a plastic molding clipped or welded to the smooth inner circumference of the cone ring, and an O-ring received in a retaining groove of the plastic molding.

4 Claims, 2 Drawing Sheets

PLANET GEAR CARRIER WITH AN ANNULAR OIL SHIELD

FIELD OF THE INVENTION

The invention relates to a planet gear carrier, for use in a vehicle transmission, having an annular oil shield that seals in lubricant.

BACKGROUND OF THE INVENTION

In a planet gear carrier used in a vehicle transmission, lubrication is needed for the needle bearings and other parts. If lubricant can leak out to the point where the parts lose their lubrication, then problems arise. Therefore, the need arises for an oil shield that will provide complete sealing to capture the lubricant and prevent leakage.

An example of a planet gear carrier with an oil shield is disclosed in European patent 0 274 874. In this planet gear carrier arrangement, the oil shield that is secured in a region radially outside the planet wheel spindle to a side wall of the planet gear carrier is formed from a simple sheet metal pressing with a radial flange part and a conical capture part, the oil shield being fixed at its flange part by means of a snap ring or locking ring which also serves to retain the planet wheel spindle.

This arrangement and form of an oil shield suffers from the disadvantage that a considerable amount of the captured lubricant can be lost radially across its flange part and the fastening through the retaining ring, since the retaining ring with a radial opening in it does not provide complete sealing. Lubricating problems can then arise from lack of lubricant, requiring the whole of the lubricant captured by the oil shield to be passed to the planet wheel bearings.

In an attempt to overcome these problems, an oil shield was made up of a radial flange part and a conical capture part and secured by a snap ring, the outer circumference of the flange part being provided with an axially vulcanized-on seal of elastic material which formed a seal relative to the inner end region of a side wall, formed as a drum, of a planet gear carrier. However, the manufacturing operation for vulcanizing the seal on to the sheet metal oil shield is relatively troublesome and costly, and also the groove required for the retention of the oil shield by means of a snap ring requires an additional machining step on the drum-shaped side wall of the planet gear carrier.

SUMMARY OF THE INVENTION

In its embodiments, the present invention contemplates an annular oil shield, for use in a planet gear carrier having a planet wheel spindle with axial lubrication bores present within it and a side wall formed as a drum member having an inner circumference in a region outside the planet wheel spindle. The oil shield includes a self-locking cone ring spreadably braced against the inner circumference of the drum member, with the cone ring having an inner circumference. The oil shield also includes a plastic molding affixed to the inner circumference of the cone ring and includes a retaining groove, and an O-ring received in the retaining groove whereby the oil shield is insertable into the drum member until it abuts the side wall of the planet gear carrier.

Accordingly, it is an object of the invention to provide an improved annular oil shield for use in a planet gear carrier in which the oil shield is simple and inexpensive to manufacture and also can be secured to the side wall more simply and securely and assures complete sealing to avoid losing a considerable amount of captured lubricant.

BRIEF DESCRIPTION OF THE DRAWINGS

The invention will now be described in more detail with reference to the accompanying drawings, in which.

DETAILED DESCRIPTION OF THE PREFERRED EMBODIMENTS

Figure 1:
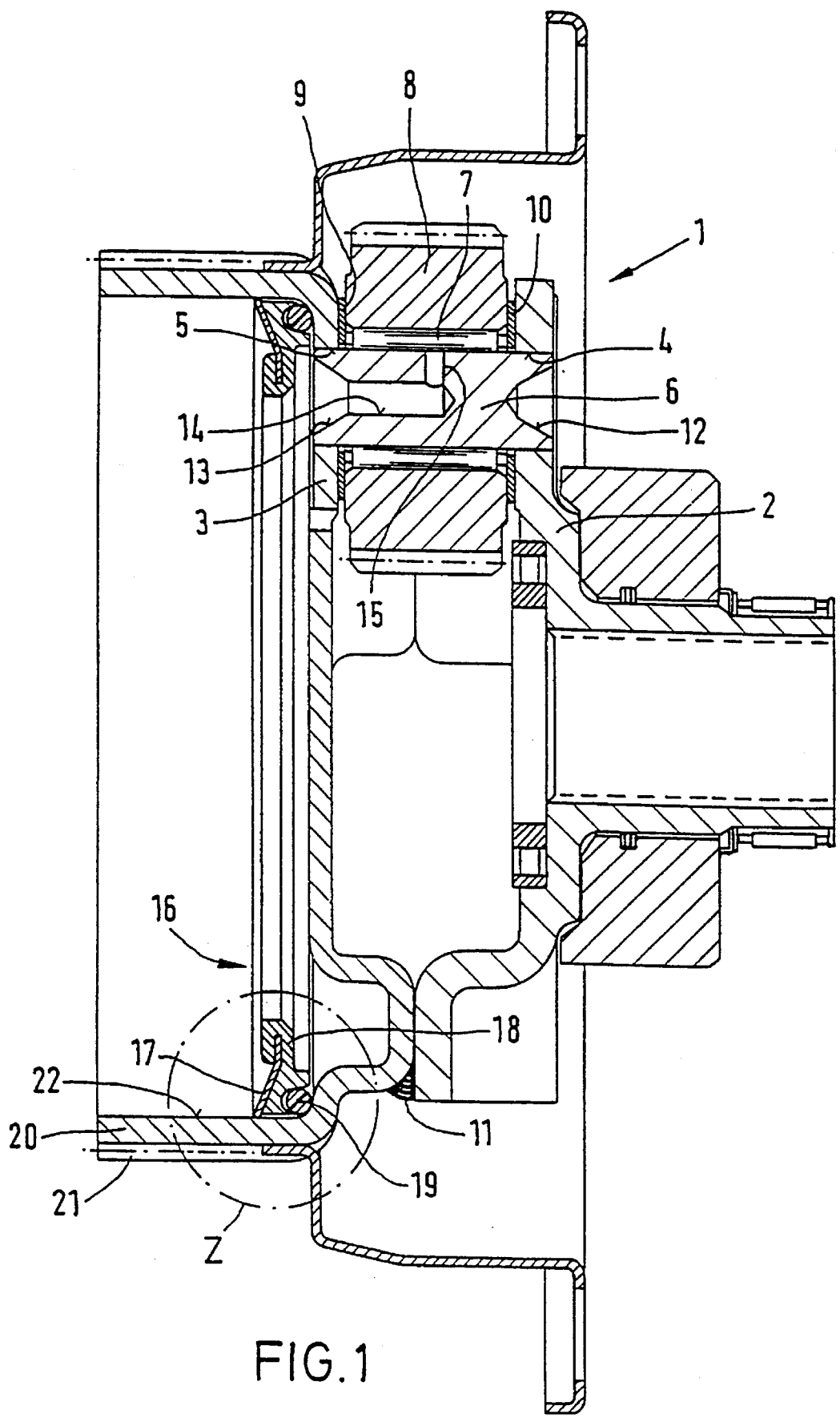
FIG. 1 is a vertical section through a planet gear carrier having an annular oil shield in accordance with the present invention.

FIG. 1 shows a planet gear carrier 1 that includes a planet gear carrier hub member 2 and an opposed side wall 3, which include corresponding bores 4 and 5, respectively. A plurality of planet wheel spindles 6 are received by bores 4 and 5. Planet wheels 8 are mounted on planet wheel spindles 6 to rotate by way of needle bearings 7. Thrust washers 9 and 10 are arranged in a known manner between the hub member 2 and side wall 3 on either side of the planet wheels 8.

The two planet gear carrier members, namely the hub member 2 and side wall 3, can be fabricated for example as cold extruded parts or sheet pressings welded together at 11 to form the planet gear carrier 1. The planet wheel spindles 6 have conical counterbores 12 and 13 at their ends by means of which they are secured in the bores 4 and 5 of the planet gear members 2 and 3 by radial expansion. From the conical recess 13, an axial bore 14 extends to meet a radial bore 15 through which lubricant is led to the needle bearing 7 of each planet wheel 8.

The side wall 3 is formed integrally with a drum member 20 for an adjacent clutch. Drum members 20 for clutches inside an automatic transmission have on their outer circumference a toothed profile 21, which may for example be made by rolling and is intended to receive radial projections of corresponding plates of multi-plate friction clutches. For this reason the end region of the internal circumference 22 of the drum member 20 cannot be made perfectly round, and as a result, it is difficult to form a retaining groove, e.g. for a snap ring, in it by machining.

Figure 2:
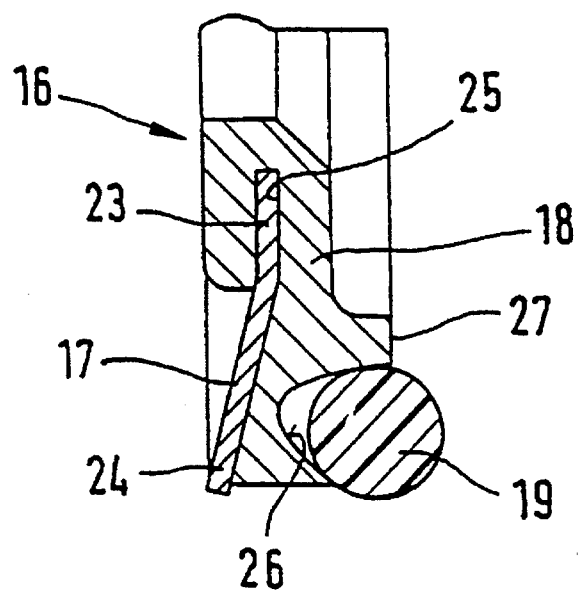
FIG. 2 is a view, on an enlarged scale, of the encircled area Z in FIG. 1, with an O-ring inserted in the retaining groove and the oil shield not yet mounted.
Figure 3:
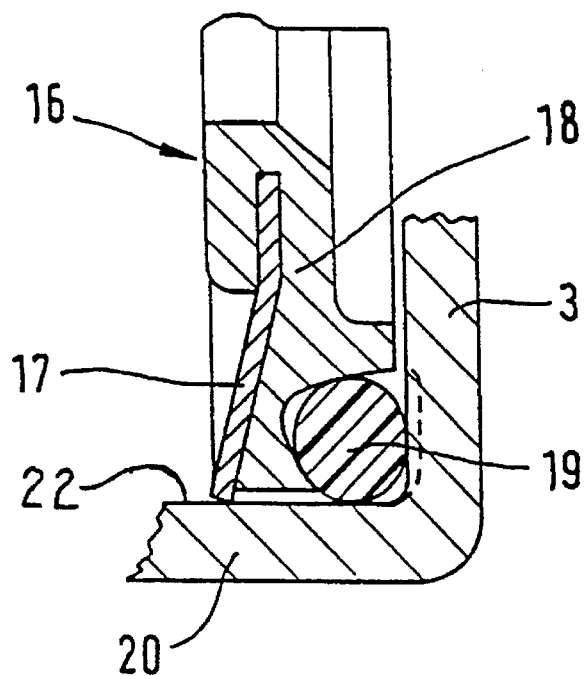
FIG. 3 is a view similar to FIG. 2 with the oil shield of the invention shown installed.

The drum member 20 receives the oil shield 16 in its interior. The oil shield 16 is comprised of a self-locking cone ring 17, a plastic molding 18 and an O-ring 19. As can be seen from FIGS. 2 and 3, the self-locking cone ring 17 includes an inner flat ring part 23 and an outer conical ring part 24. The plastic molding 18 is provided with a radially extending groove 25 to receive the cone ring 17, and a retaining groove 26 for the O-ring 19. The retaining groove 26 for the O-ring 19 is preferably formed with an outwardly inclined V-shape, as can be seen from FIG. 3. Thus, the O-ring 19 can be deformed radially outward by bearing axially against the end of the side wall 3 to an extent determined by an end stop 27, in order to ensure reliable sealing against the inner circumference 22 of the drum member 20. The molding 18 extends so far radially inward that its inner edge overlaps the axial lubricating bores.

The individual parts of the oil shield 16 of the invention can be fabricated by simple, known manufacturing processes; the cone ring 17, the molding 18 and the O-ring 19 can be preassembled to a sub-assembly which then only needs to be pushed axially into the drum part 20 until the end stop 27 abuts the side wall 3.

The oil shield 16, made up of the combination of the self-locking cone ring 17, the molding 18 and an O-ring 19, makes complete sealing of the end region of the internal circumference 22 of the drum member 20 possible even if the circular contour of the drum member 20 exhibits irregularities arising from the forming of the toothed profile 21.

While certain embodiments of the present invention have been described in detail, those familiar with the art to which this invention relates will recognize various alterative designs and embodiments for practicing the invention as defined by the following claims.

We claim:

1. A planet gear carrier comprising:

a planet wheel spindle having axial lubricating bores;

a side wall formed as a drum member having an inner circumference in a region outside of the planet wheel spindle;

an annular oil shield having a self-locking cone ring spreadably braced against the inner circumference of the drum member, the cone ring having an inner circumference;

a plastic molding affixed to the inner circumference of the cone ring and including a retaining groove; and an O-ring received in the retaining groove whereby the oil shield is insertable into the drum member until it abuts the side wall of the planet gear carrier.

2. A planet gear carrier according to claim 1 wherein the retaining groove formed in the molding is a radially outwardly inclined V-shape that supports the O-ring against the side wall and drum member in an axially outwardly rebounding manner.

3. An annular oil shield according to claim 1 wherein the molding further includes an end stop whereby the oil shield is insertable into the drum member until the end stop abuts the side wall.

4. An annular oil shield according to claim 2 wherein the molding further includes an end stop whereby the oil shield is insertable into the drum member until the end stop abuts the side wall.

* * * * *